April 17, 1962     K. H. HESS     3,029,585
TREE SHAKING DEVICE WITH REEL MEANS

Filed April 22, 1959     4 Sheets-Sheet 1

INVENTOR.
KENNETH H. HESS
BY
ATTORNEY

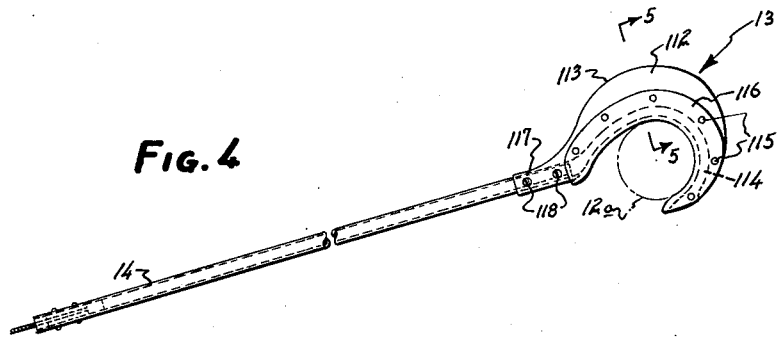
Fig. 4
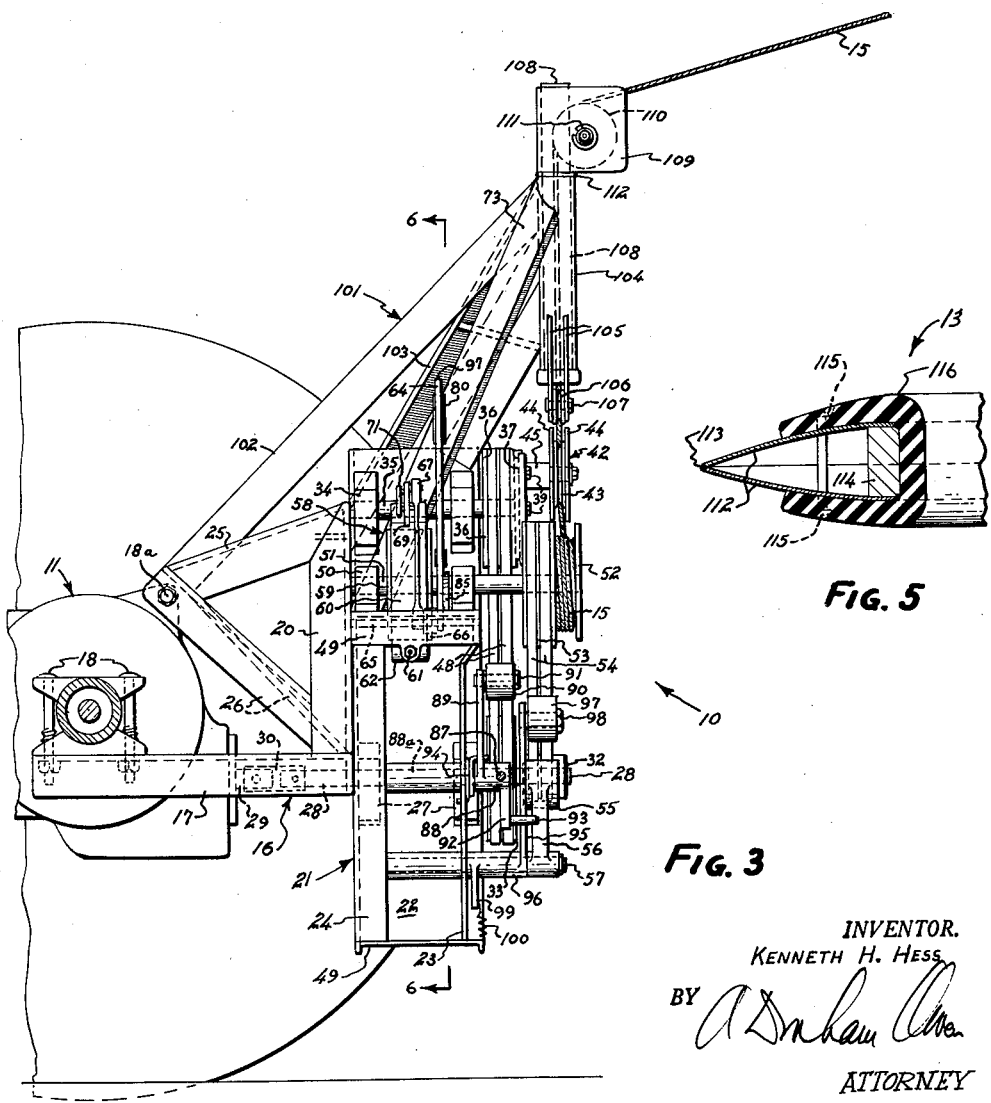
Fig. 5
Fig. 3
INVENTOR.
KENNETH H. HESS
BY
ATTORNEY

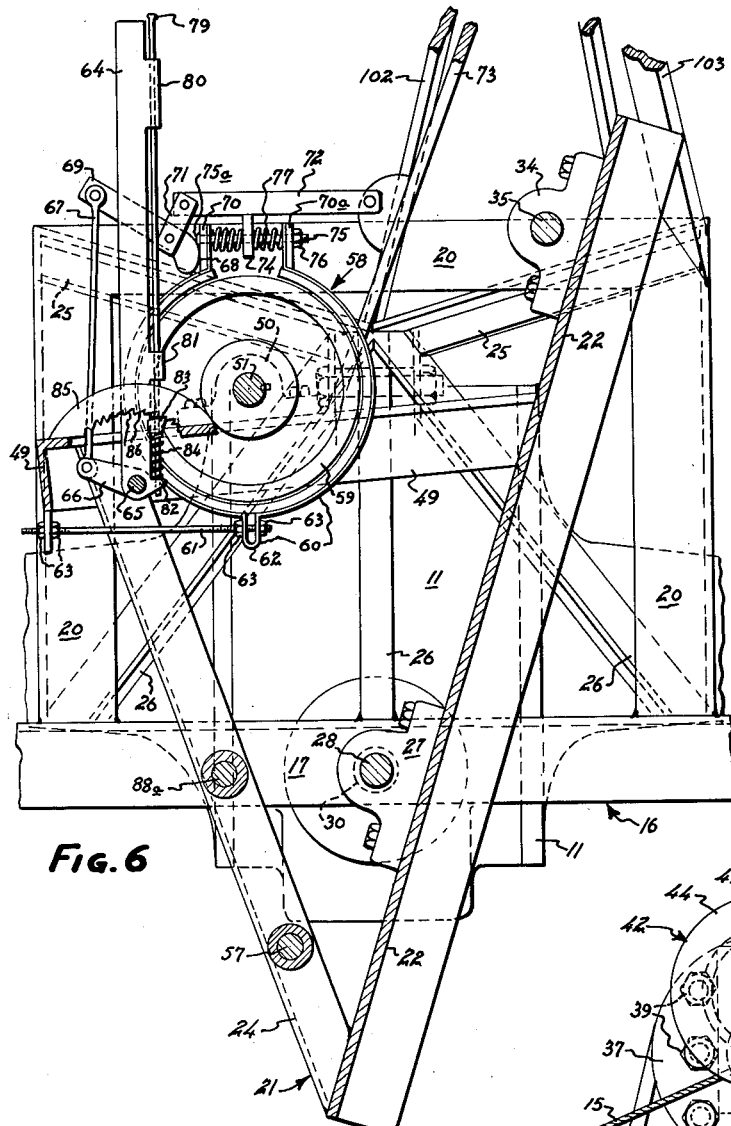

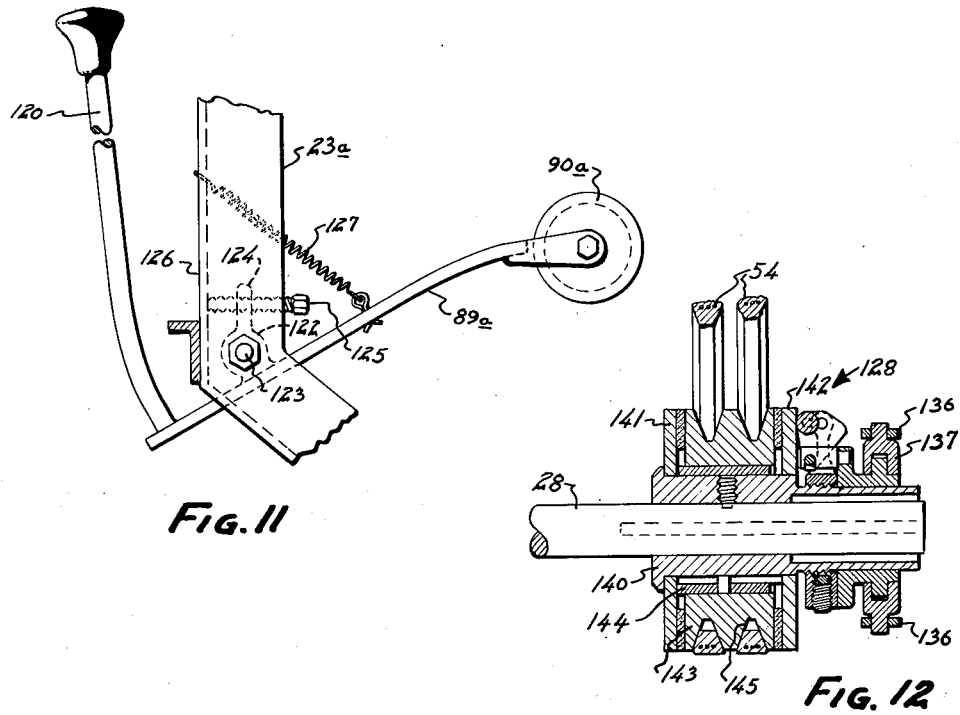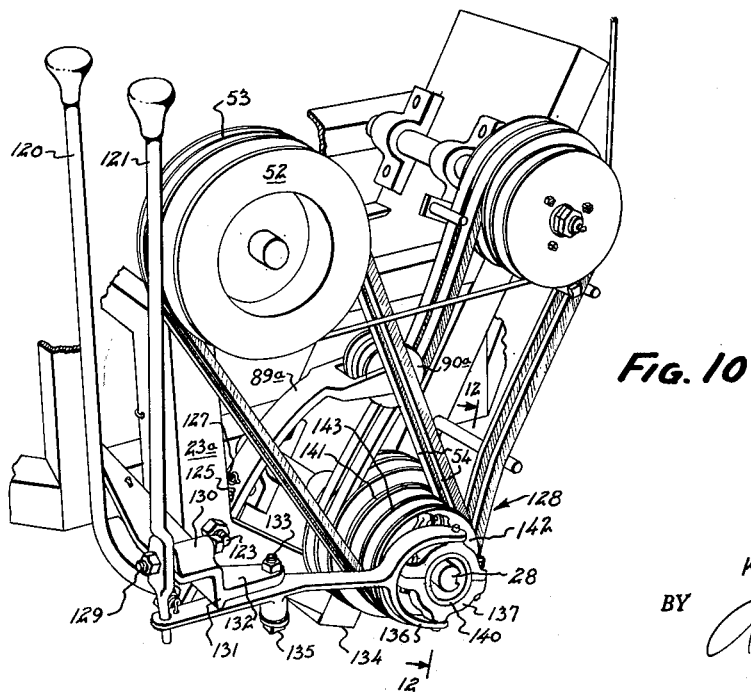

United States Patent Office 3,029,585
Patented Apr. 17, 1962

3,029,585
TREE SHAKING DEVICE WITH REEL MEANS
Kenneth H. Hess, 2785 W. Dry Creek Road,
Healdsburg, Calif.
Filed Apr. 22, 1959, Ser. No. 808,227
16 Claims. (Cl. 56—328)

This invention relates to a device for producing vibratory motion on objects located remotely from the device. More particularly, it relates to a tree-shaking machine which may be removably attached to and powered by a vehicle, for removing fruit from trees.

The problem of harvesting fruit has long presented serious and often burdensome difficulties for the orchard farmer, for harvesting often constitutes the difference between his success and failure. Fruit tends to ripen rapidly during the peak of the growing season, and efficient harvesting removes the fruit as soon as it is ripe. Heretofore, for the most part, a large army of fruit pickers performed the job by hand. This manual method required the fruit grower to employ mainly itinerant workers with attendant problems of the high cost of housing, increased wages and labor problems, etc. As a result, there has long been a serious need for the mechanization of the fruit-removal process.

In some areas moderate success has been obtained by using mechanical tree-shaking devices in combination with canvas fruit-catching hoppers. It has been shown that the mechanical method of shaking the tree when the fruit is ripe and catching the fruit as it falls can be practiced economically, quickly, and with negligible damage to the fruit.

However, the adoption of this mechanical fruit-harvesting method has been held back by the relative complexity and high cost of prior-art tree-shaking equipment. The relatively large, complex, and cumbersome shaking devices found in the prior art not only require a large initial investment by the farmer but they also are limited in mobility and adjustability to various harvesting conditions, so that their efficiency of operation is lowered.

For example, prior to the present invention, mechanical tree-shakers comprised a large, extendable boom mounted on a specially-built vehicle of relatively large size. This vehicle had to be maneuvered close to each tree in order to attach the boom to the tree. The acquisition of the specialized vehicle represented a substantial investment for a farmer. When no tree shaking was required, the special vehicle sat idle; so its depreciation was high.

The problem of providing efficient mechanical tree-shaking at relatively low cost has been solved by my invention, which provides a detachable tree-shaking device that is adaptable to any one of a number of typical farm vehicles. My tree-shaking device is small, in comparison to the prior-art devices, and is easily handled by one or two men; it represents a relatively small investment for the farmer, making the mechanical fruit-picking method much more attractive.

In addition to the economic advantages, my invention— by using a cable to shake the tree instead of a boom— provides a much more versatile tree-shaking device and has many other advantages. The tractor to which my new shaking device is attached may be located at much greater distances from the tree than the vehicles used in boom-type tree-shakers. Also, a hook-type grapple on the flexible cable can be attached at any of several locations on a tree and enables great selectivity; only a selected area of the tree need be shaken.

Another object of my invention is to provide a tree-shaker that, when adapted to a typical farm vehicle, may be placed in one position and be able to service several trees from that position, without being moved.

Still another object of my invention is to provide a tree-shaker that is simple in its operation and has means to vary the intensity and frequency of the shaking motion so as to compensate for the different sizes of trees in the orchard and the variable condition of the fruit.

Still another object of my invention is to provide a tree-shaking device that is relatively inexpensive and simple to operate with a minimum of labor.

Another object of my invention is to provide a cable-type tree-shaker, having means to attach the cable to a tree and to take up the cable slack and hold the cable taut while it is being vibrated to shake the tree.

More specifically, an object of my invention is to provide a cable-type tree-shaking device having means to control cable tension and means to vibrate the cable, and deriving its power of operation through a main driveshaft which is adaptable to couple with a power take-off means on a standard tractor, pick-up, or other typical farm vehicle.

Another object of the present invention is to provide a cable type tree-shaking device having a means of adjusting the stroke of the vibrating mechanism to thereby change the amplitude of the vibrating force on the tree easily and rapidly in the field.

Still another object is to provide a tree-shaking device wherein the frequency and force of the vibration movement can be altered readily in the field to compensate for varying harvest conditions.

Other objects and advantages will become apparent from the following description of a preferred form of my tree-shaker, taken in connection with the drawings, in which:

FIG. 3 is a view in side elevation of the tree-shaker mounted on a tractor;

FIG. 4 is a view in perspective of the grappling hook and its handle, with the cable broken off;

FIG. 5 is an enlarged view in section of the hook, taken along the line 5—5 in FIG. 4;

FIG. 6 is a view in section on an enlarged scale of the cable-drum brake taken along the line 6—6 in FIG. 3;

FIG. 7 is a fragmentary plan view of the brake shown in FIG. 6;

FIG. 8 is an enlarged fragmentary end view showing the eccentric wheel;

FIG. 9 is a fragmentary top plan view showing the eccentric wheel of FIG. 8;

FIG. 10 is a fragmentary view in perspective of a modified form of tree-shaker using a two lever control system;

FIG. 11 is a fragmentary view partially in section showing the eccentric drive control lever system; and FIG. 12 is an elevation view in section of the clutch assembly for the cable take-up drive shown in FIG. 10.

General Description

Figure 1:
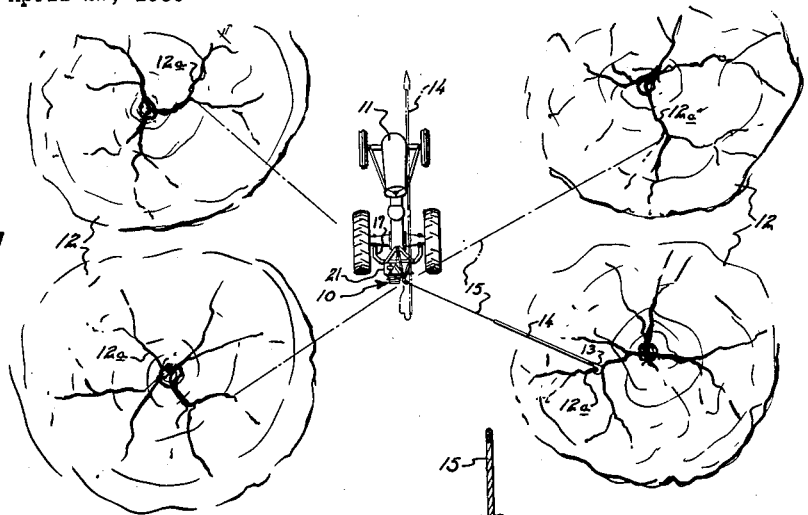
FIG. 1 is a somewhat schematic plan view of a portion of an orchard, showing a tree-shaker embodying the principles of the invention mounted on a tractor and the tractor located where it successively shakes different trees.
Figure 2:
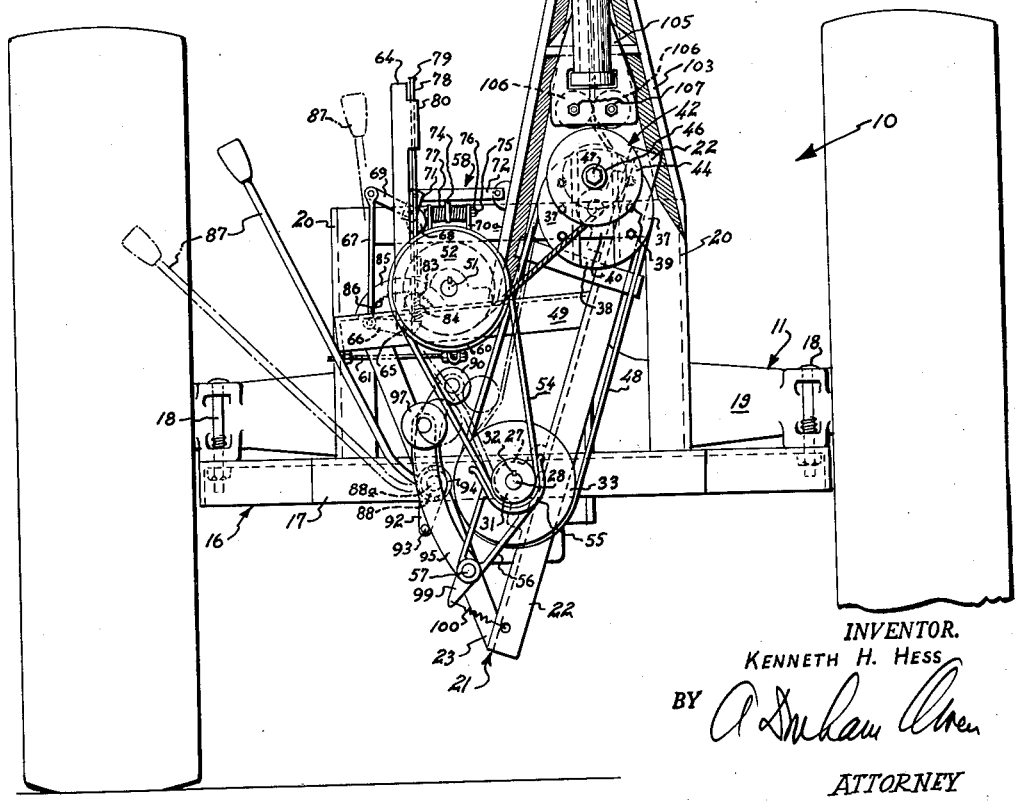
FIG. 2 is a view in rear elevation on an enlarged scale of the tree-shaker as it is mounted on a tractor.

Broadly speaking, my invention is directed to a novel device which may be removably attached to a tractor for producing vibratory or pulsating motion of objects, such as trees and limbs, connected to the device at a distance from the tractor. In general, the shaker assembly 10 (as shown in FIGS. 1 and 2) has a supporting frame structure 16 mounting a driveshaft 28, which is adapted to be coupled with and driven by some convenient power source such as a power-take-off shaft 29 (see FIG. 3) of a tractor 11 or pick-up truck. The driveshaft 28 is arranged to drive a cable drum 52 upon which is wound a cable 15 having a large hook 13 at its free end, with which to grapple tree limbs. The driveshaft 28 is also connected to an eccentric or vibratory means 42 which can pulsate or vibrate the cable 15. My novel combination further includes control means 87 to alternately direct the power of the driveshaft 28 to either the cable drum 52 or to the eccentric or vibratory drive means 42, so that after the hook 13 has been placed on a tree limb the cable 15 may first be drawn taut by the drum 52, and then held in that state by a brake assembly 58 while power is supplied to drive the vibratory means 42 to shake the tree.

Referring now in greater detail to the drawings, FIG. 1 shows a tree-shaker assembly 10 embodying the features of my device attached to a typical rubber-tired farm tractor 11, for use in an orchard having trees 12. The tree-shaker assembly 10 is shown with a hook 13 attached to a limb 12ᵃ of one tree 12. The hook 13 is attached to a long rod or pole 14 (shown in detail in FIG. 4), which is easily handled by the tree-shaker operator and enables him to reach the upper limbs and attach the hook 13 at any location desired. A distinct advantage of the hook-and-cable method of shaking used by my invention is that it provides greater selectivity in directing the vibratory force to the desired location. A cable 15 is attached to the rod or hook-handle 14 and extends back to the tree-shaker assembly 10, and when the cable 15 is drawn tight a force against the cable exerted at the tree-shaker assembly on the tractor 11 imparts a shaking motion to the tree limb 12ᵃ.

The Framework

The shaker assembly 10 shown in FIG. 2 comprises a supporting frame 16 which may be adapted for attachment to any convenient vehicle having a power take-off shaft 29 (FIG. 3) such as the tractor 11 or a pick-up truck. In the arrangement shown in FIG. 2, a U-shaped horizontal frame member 17 is attached by bolts 18 to the rear chassis 19 of the rubber-tired tractor 11. Various vehicles could be adapted to mount my tree-shaker assembly 10 and the instllation could be made on either the front or rear end of the vehicle, although I prefer to mount it on the rear end of a typical light farm tractor.

Returning to the assembly 10 itself and referring to FIGS. 2 and 3, in the embodiment shown, vertical frame members 20 welded to horizontal member 17 support an inverted A-frame 21 having a back frame member 22 and front frame members 23 and 24. Additional support members 25 and 26 attached to the tractor 11 by bolt 18ᵃ are also welded to vertical frame members 20 and to horizontal frame member 17 to thus support the A-frame 21 and attach it to the tractor 11. It is to be understood that the frame assembly 16, which provides for the attaching of the shaker assembly 10 to the tractor 11 and the mounting of the essential shaker elements, may take many forms in order to meet requirements of different installations on particular vehicles, while still incorporating the many features within the scope of the invention.

Mounted on back frame 22 of the A-frame 21 are bearing blocks 27 which support the main driveshaft 28 of the shaker assembly 10 and are so located that when the shaker assembly 10 is mounted on the tractor 11 the driveshaft 28 is aligned with a tractor power take-off shaft 29. Coupling means 30 such as a spline or an equivalent device on the end of the driveshaft 28 facilitates its easy attachment to the power take-off shaft 29.

At the other end of driveshaft 28 is mounted a first pulley 31 attached by a key 32. A second and larger pulley wheel 33 is mounted similarly on the main driveshaft 28 adjacent the first pulley 31.

The Eccentric Wheel 42

A second set of bearing blocks 34 is mounted above the main driveshaft 28 on the back frame 22, and the blocks 34 are aligned with each other to retain, in the conventional manner, a second shaft 35 substantially parallel to the main shaft 28. Mounted on the second shaft 35 is a pulley wheel 36 attached thereto in a standard manner, and adjacent said pulley 36 is a faceplate 37, having a T-slot 38, which is attached by bolts 39 to the pulley 36. See FIG. 9. Adapted to fit in the T-slot 38 is a rectangular plate 40 to which is fixed a short shaft 41. The bolts 39 enable solid affixation of the plate 40 at any point along the T-slot 38. Mounted on said short shaft 41 is a sheave 42 having a circular grooved inner wheel 43 with flange members 44 attached to each side of the sheave 42. A cylindrical sleeve 45 (FIG. 9) surrounds the short shaft 41 between the sheave 42 and the rectangular plate 40 to form a spacer, and a washer 46 and bolt 47 hold the sheave 42 on the short shaft 41. A pair of belts 48 (FIGS. 2 and 3) are loosely attached around the larger pulley 33 on the main shaft 28 and extend upward around the pulley wheel 36 on the shaft 35. A removable retaining pin 118 (FIG. 8) is mounted to pass between the flange members 44 to keep the cable 15 on the sheave 42.

The Cable Drum 52

A U-shaped cross-support frame member 49 is supported at one end by front frame members 23 and 24 and extends across to and is supported at its other end by the inclined back frame member 22. On cross-support frame member 49 are mounted another set of bearing blocks 50, shown in FIG. 3, which are aligned and are adapted to retain a cable drumshaft 51. Keyed to the cable drumshaft 51 is a cable wind-up drum 52 and adjacent thereto is a wheel pulley 53. A second pair of belts 54 is loosely attached around the first pulley 31 on the driveshaft 28 and the wheel pulley 53. A yoke 55 curves around the pulley 31 to keep the belts 54 properly aligned with the pulley 31, the yoke 55 being supported by a bracket 56 which is attached to a shaft 57 extending from front frame member 23.

The Brake Assembly 58

At the end of the cable drumshaft 51 opposite the wind-up drum 52 is located a brake assembly 58 shown in FIGS. 6 and 7. The brake assembly 58 comprises a brake wheel 59, which is keyed to the cable drumshaft 51, and a brakeband 60. The brakeband 60 is held in position by a rod 61 attached to flanges 62 on the brakeband 60 and to the vertical frame member 20 by nuts 63. A brake handle 64 tightens the band 60 around the brake wheel 59 to hold the shaft 51 and the cable drum 52 in the desired position. Movement of the brake handle 64 in the counterclockwise direction, as viewed in FIG. 6, about a pivot pin 65, rotates a crank 66 which moves a rod 67, forcing a cammed surface 68 of a link 69 against one of two extending flange members 70 on the brake band 60. A link 71 is pinned to a link 72 which is attached to a frame member 73 and serves to position the cammed surface 68 of the link 69 on the brakeband flange 70. Extending downward from the link 72 is a projection 74 with an opening through which passes a rod 75 having a head 75ᵃ. The rod 75 is attached at one end by a nut 76 to a flange member 70ᵃ. The rod 75 also passes through and is retained by head 75ᵃ to the other flange member 70 and is encircled by a coil spring member 77 which is confined between the inner faces of the brakeband flanges 70 and 70ᵃ.

A locking pin 78 having a rounded knob 79 at its upper end extends parallel to the brake handle 64 through guiding sleeves 80 and 81 and passes through a projection 82 of the brake handle 64 at its lower end. A pawl 83 is fixed to the locking pin 78 near its lower end. A spring member 84 on the locking pin 78 extends between the pawl 83 and the projection 82 to give the pawl 83 an upward force against a brake quadrant 85, having a rack of ratchet teeth 86 on its inner surface. The teeth 86 are shaped to receive the pawl 83 so as to lock the brake handle 64 when the brake is applied. Thumb pressure on the rounded knob 79 of the locking pin 78 pushes the pawl 83 downward, releasing it from the ratchet teeth 86, so that the handle 64 can be moved forward to release the brake.

Other variations in the arrangement of the brake elements could be used to provide the braking of cable drum 52. The system illustrated and described above is not meant to limit the present invention to this particular structure.

Power Tranfer Means 87

The power transfer means for the tree-shaker device in the embodiment shown in FIG. 2 conveniently comprises a single control lever control lever 87 which is fixed to a sleeve member 88 around a control shaft 88ª mounted on the frame members 23 and 24. Adjacent to the frame member 23, and extending upward from the sleeve 88, is fixed a crank-arm 89 having at its end an axle 91 on which is rotatably mounted an idler pulley 90 that lies substantially parallel to the sleeve 88. On the outer end of the sleeve 88 and extending downward is a crank-arm 92 having a pin 93 attached thereto at a right angle to the crankarm 92. A spring member 94 is attached at one end to the frame member 23 and at its other end to the crankarm 89, so that, with no pressure on the control handle 87, the spring member 94 maintains it in the neutral position. Forward or clockwise movement of the control lever 87, as viewed in FIG. 2, moves the idler-wheel 90 on the crankarm 89 to engage the belts 48, loosely connecting the second pulley-wheel 33 on the drive-shaft 28 and the pulley-wheel 36 on the shaft 35, thereby driving the eccentrically mounted sheave 42. The tightening of the belt 48 by the idler-wheel 90 causes the belt 48 to transmit power from the main drive-shaft 28 to the driving-shaft 35 which eccentrically rotates the sheave 42 to impose a pulsating force on the cable 15.

When the control handle 87 is rotated in the counterclockwise direction, the pin 93 on the crank 92 engages another crankarm 95 which is attached to a sleeve member 96 that is free to rotate about the fixed shaft 57, mounted on the lower portion of A-frame 21. The crankarm 95 has at its upper end an axle 98 with idler-wheels 97 rotatably mounted parallel to the control shaft 88. Projections 99 on the sleeve 96 are connected by springs 100 to the A-frame 21 to keep the idler-wheels 97 in the retracted position when not in use. The idler-wheels 97 are engaged against the belt 54 by counterclockwise movement of the control lever 87 and pressure of the idler-wheels 97 tightens the belt 54 so that power is transmitted from the end-pulley 31 on the main drive-shaft 28 to the drive-pulleys 53 on the cable-drum-shaft 51.

An alternate form of control system using two control levers 120 and 121 instead of one is shown in FIG. 10. Lever 120 is used to control the transfer of power from the drive-shaft 28 to the eccentric pulley 36 to drive the face-plate 37, and lever 121 is used to transfer power from drive shaft 28 to take-up drum 52.

A detail drawing (FIG. 11) shows the arrangement of lever 120, which operates in a similar manner as lever 87 shown in FIG. 2. At the end of lever 120 is attached a crank arm 89ª having an idler roller 90ª, which is adapted to engage and tighten the normally loose belts 48 connecting the drive shaft and the eccentric drive pulley. The crank arm 89ª similar to crank arm 89 (FIG. 2) is mounted on a sleeve 122 for rotation about a pivot shaft 123 attached to frame member 23ª. On an extension 124 of sleeve 122 is mounted an adjustable bolt 125, the end of which engages the flange 126 of frame member 23ª to limit the amount of back travel of crank arm 89ª. A spring member 127 is attached to crank arm 89ª to urge it normally in the "off" or "retracted" position.

The control lever 121 for the cable take-up drum 52 in the embodiment of my invention shown in FIG. 10 actuates a belt type clutch 128 fixed to the end of the drive shaft 28. The lever 121 is mounted on a short pivot shaft 129 housed in a bracket 130 fixed to a frame member 131, member 131 in turn being welded to frame member 23ª. In a bracket 132 attached to frame member 131 is mounted a second pivot shaft 133 on which is pivotally mounted a link 134 retained by bolt 135. The link 134 is attached at one end to the lower end of control lever 121 and is forked to form a yoke 136 at its other end and attached to the actuating clutch member 137 of clutch 128. Movement of control lever 121 about shaft 129 causes movement of link 134 and the yoke 136 on the clutch 128.

The clutch 128 may be of any conventional design such as the Borg-Warner LMV clutch shown in FIG. 12. The clutch 128 comprises generally a sleeve 140 which is fixed on drive shaft 28. Mounted on sleeve 140 are flange members 141 and 142, one of which is movable toward the other along sleeve 140 by the action of yoke 136 on the clutch linkage.

On the sleeve member 140 between clutch plates or flange members 141 and 142 is mounted a V-belt sheave 143 whose base 144 provides a running fit thereon. The sheave 143 has two grooves 145 in which lie the belt members 54 which are tightly connected to a two-groove cable take-up pulley 53 (FIG. 10).

In operation the sleeve member 140 is constantly turning with the drive-shaft 28. Actuation of lever 121 moves link 134 and yoke 136 through the clutch 128 to press clutch plate 142 against the sheave 143 on sleeve member 140, causing the sheave 143 to rotate and thus drive belt 54 and the cable take-up drum 52. The clutch mechanism 128 is a self-contained unit which is mounted easily on the drive shaft 28. It is obvious, of course, that other clutching means may be employed to connect the drive shaft 28 to the cable take-up drum 52. Thus, the foregoing description is not meant to be limiting with regard to the two-lever control system applied to my invention.

Full-Swiveling Cable Guide 110

A pedestal 101 (FIGS. 2 and 3) is formed by frame members 102, 103 and 73, member 102 being attached to support member 26, member 103 being atached to vertical support member 20, and member 73 being attached to cross-support frame member 49. The pedestal 101 provides a support for a hollow cylindrical cable guide 104 through which passes the cable 15 leading from eccentric sheave 42. Parallel flange members 105 are welded to the lower portion of the guide 104, and between them are mounted a pair of sheaves 106 on axles 107 extending through the flanges 105. The sheaves 106 are spaced far enough apart to permit the free lateral movement of the cable 15 during its excitation by the eccentric sheave 42. On the upper end of the cylindrical guide means 104 is another coaxial cylindrical member 108 which fits concentrically within the cylindrical guide means 104 with sufficient clearance to permit smooth relative movement. Parallel flange members 109 are attached to the upper cylindrical member 108 and serve to support a sheave or idler pulley 110 mounted for 360° rotation on an axle 111 between the flange members 109. A washer 112 is positioned atop guide member 104 and around member 108 to provide a smooth bearing surface for ease of rotation of member 108.

The cable 15 then extends from the wind-up drum 52 over the eccentric sheave 42, thence between the guide sheaves 106 through the cylindrical members 104 and 108 and over the sheave 110, continuing outward to a tree 12 in any desired direction, the sheave 110 on the cylindrical member 108 being swivelable in a full 360° range.

The Grappling Hook 13

For a grappling means, I prefer to use a large metal hook 13 attached to a long handle 14 made from some durable but preferably light metal. The cable 15 is firmly attached by some standard means to the end of the handle 14. FIG. 4 shows a typical hook assembly, as it is attached to cable 15.

I have found that to achieve the strength required to prevent the hook 13 from straightening out during the shaking operation, the hook construction is vitally important. My preferred hook structure, which has proved highly successful under extreme test conditions, is shown in cross-section in FIG. 5. The strength and rigidity of the hook 13 is derived from sheet steel members 112 which are cut in the shape of a hook and are welded together along the outer edge 113. The members 112 are flared in cross-section, to give thickness, and are welded to an inner ring 114 of steel, having a rectangular cross-section which extends entirely about the inner edge of the hook. Over this basic hook frame structure I prefer to attach, by means such as bolts 115, a rubber protective cover 116, which lies over the inner surface of the hook 13 to prevent damage to tree limbs during the shaking operation. The hook 13 is attached to the handle 14 in a convenient manner by extending members 112 to form an attaching neck 117 which is fitted around the handle 14 and joined to its by bolts 118. Brackets may easily be attached to the tractor to provide a carrying means for the hook-and-handle assembly.

*Operation of the Tree-Shaker*

In operation, the tree-shaker assembly is attached to the tractor 11 at the appropriate points by bolts 18 and 18ª and the driveshaft 28 is coupled to the tractor power take-off shaft 29. The tractor 11 is then driven to the orchard and parked in a convenient location with its motor running and turning the driveshaft 28. The operator removes the hook assembly from its carrying bracket on the tractor and proceeds to place the hook 13 over a limb 12ª of the tree 12 selected for shaking. Movement of the brake handle 64 will allow cable-drum 52 to run free on the shaft 51 as the cable unwinds and the hook 13 is moved to the desired position.

With the hook 13 attached to the tree, the control lever 87 is pulled back so that the pin 93 on the crank 92 engages the crankarm 95 and presses the idler-wheel 97 against the belts 54. This causes the belts 54 to tighten and to transmit power from the driveshaft pulley-wheel 31 and the cable drum-wheel 53, thus taking up the cable slack until the cable 15, stretching from the arm 14, has reached the desired tension.

When this point has been reached, the brake handle 64 is moved to tighten the brakeband 60 on the wheel 59 to lock the cable drum-shaft 51. The control lever 87 is then pushed in the opposite direction, to press the idler-wheel 90 against the belts 48, causing the driveshaft wheel 33 to move the belts 48 and the drive-pulley wheel 36 on the shaft 35. This action rotates the face-plate 37, upon which is fixed the eccentrically mounted sheave 42. The rotation of face-plate 37 causes sheave 42 to push against the taut cable 15 during each revolution, providing the sinusoidal increasing and decreasing of tension on the cable 15. With the heavy tractor 11 fixed in position, the action of the sheave 42 on the cable 15 causes a rapid oscillation of the hook 13, thus shaking the tree 12 and causing the ripe fruit to fall into an appropriate catching device (not shown). Where the two lever control system shown in FIGS. 10–12 is utilized, the individual levers 120 and 121 would be operated separately in the manner described previously to provide the cable take-up and vibration operations.

An important feature of my invention is that the frequency and amplitude of the shaking motion can be varied to suit the different conditions of the trees and fruit. The frequency of the shaking motion can be varied by changing the engine speed of the tractor or by applying varying pressure to the belts 48, which drive the eccentric sheave 42, to permit the desired amount of slippage. The stroke of the eccentric sheave 42 is varied by movement of the rectangular plate 40 in the T-slot 38, by merely loosening bolts 39. This changes the distance of the center of sheave 42 from the center of rotation of the face-plate 37. Thus, it is possible by simple adjustments to give a particular tree a relatively "hard" or "soft" shaking, to meet the conditions of the tree and its fruit.

There are many other advantages in the operation of my novel tree-shaker. For example, the full swiveling action of the guide sheave 110 permits the tractor 11 to remain in one position at a substantial distance, while several trees are serviced. The hook 13 on the handle 14 may be placed selectively on any desired limb or branch 12ª to get the most efficient result.

As shown by the foregoing description of my invention, the tree-shaker assembly may be built as a small, compact unit which can be adaptable to any appropriate farm vehicle, and thus the need for a large, expensive, specialized vehicle has been eliminated. This feature brings the benefits of mechanical fruit harvesting within the economic reach of even the smallest grower, since the investment in equipment has been drastically reduced. Furthermore, the relative simplicity of the structure of my device lends itself to a minimum of maintenance, and the servicing required can generally be performed by the farmer himself.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In combination with a vehicle having a power take-off, a device for providing vibratory motion to an object located at a fixed distance from the vehicle, comprising: a frame attachable to the vehicle; a drive-shaft means mounted on said frame having first- and second-pulleys attached thereto, means to connect said drive-shaft means with the power take-off of said vehicle; a rotatable drum-shaft mounted on said frame having a pulley and a cable-drum attached thereto, and a cable attached to said drum; brake means on said drum-shaft; grapple means attached to the end of said cable; means to guide said cable from said drum to provide for the extension therefrom in any desired direction; a second rotatable shaft having a pulley thereon and attached to said frame between said drum and said guide means, a faceplate mounted on said second-shaft, and a cable-engaging sheave having guide flanges and being eccentrically attached to said faceplate, said cable being adapted to pass partially around said cable-engaging sheave and between its guide flanges; a first normally-loose continuous belt means extending around said first-pulley on said drive-shaft means and around said pulley on said drum-shaft; a second normally-loose continuous belt means extending around said second-pulley on said drive-shaft means and around said pulley on said second rotatable shaft; a control lever; and means associated with said control lever to alternately apply pressure against and to increase tension on said first- and second-belt means in response to movement of said control lever, whereby movement of the control lever in one direction increases tension in said first-belt means and transfers power from said drive-shaft to said drum-shaft to wind up the cable after the grapple means has been attached to an object, thus making the cable taut, the cable-tension being maintained by said brake means, and whereby movement of the control lever in the opposite direction increases tension in said second-belt means and causes rotation of said second-shaft, causing an oscillating force on the taut cable which alternately increases and decreases the cable tension and causes vibration of the attached object.

2. The device as described in claim 1, including adjustable mounting means on said face-plate for said cable-engaging sheave, whereby the center of said cable-engaging sheave can be placed at a variable distance from the center of the face-plate to vary the length of the vibration stroke.

3. The device as described in claim 1, wherein said brake means comprises a brake drum attached to said cable drum-shaft, a brake band and means to tighten said brake band on said brake drum.

4. The device as described in claim 1, wherein said means associated with said control lever comprises a control-shaft have a first crank-arm extending from said shaft and an idler-roller mounted thereon adapted to engage said first belt around said drive-shaft means and said cable drum-shaft; a second crank-arm having an idler-roller adapted to engage said second belt around said drive-shaft means and said second shaft; whereby movement of the control lever in one direction engages the idler-roller of said first crank with said first belt to drive said cable drum and movement of said control lever in the opposite direction actuates said second crank-arm to engage its idler-roller with said second belt around said drive-shaft and said second shaft to cause rotation of said cable-engaging eccentric sheave and thus a pulsating movement of the taut cable.

5. The device as described in claim 1, wherein said graple means comprises a handle, a hook member connected to said handle, said handle being attached to the end of said cable.

6. The device as described in claim 1, wherein said means to guide said cable includes a pedestal mounted substantially vertically on said frame and having guide means at the lower portion thereof to receive said cable from said cable-drum, an idler-pulley mounted on the upper portion of said pedestal, said cable adapted to pass through said pedestal and ride in said idler-pulley, said pedestal idler-pulley having means to provide full swiveling in any horizontal direction.

7. In combination with a vehicle having an auxiliary power output-shaft, a detachable tree-shaking device comprising a frame which is readily attachable to the said vehicle, a main-shaft mounted in said frame and having coupling means connectable with said auxiliary power output-shaft on said vehicle, a cable wind-up means mounted on said frame, a cable having grappling means at one end and attached to said cable wind-up means on said frame to create and sustain initial tension in said cable, an eccentrically mounted rotatable cable-engaging means mounted on said frame and adapted to press against said cable while rotating, to rapidly apply a periodic force against said cable, and control means for alternately connecting said main-shaft to drive said cable wind-up means and said cable-engaging means.

8. A device for shaking trees and the like, to cause the removal of fruit therefrom, said device being attachable to a vehicle having a rotating power source and comprising in combination: a frame, a drive-shaft mounted on said frame having coupling means adapted to connect with said rotating power-source, a cable wind-up drum on said frame having a length of cable secured at one end thereto, and grapple means secured to the other end of said cable, brake means on said drum, vibratory means adjacent said cable to periodically push against said cable to thus increase and decrease tension thereon, and control means to transfer power from said drive-shaft to either said cable wind-up drum or to said vibratory means, whereby the grappling means may be attached to a tree limb and the cable drawn taut by the wind-up drum, after which the vibratory means is applied to the cable, causing said grappling means to shake the tree.

9. In combination with a vehicle having a power take-off, a tree-shaking device for removing ripened fruit therefrom, comprising: a frame; a drive-shaft mounted in said frame, coupling means for connecting said drive-shaft with said power take-off; a cable wind-up means rotatably mounted on said frame; a cable attached to said wind-up means and grapple means on said cable; brake means on said device for holding said cable wind-up means in a fixed position; cable-vibrating means attached to a rotatable shaft mounted on said frame, means for locating said cable on said device adjacent said cable-vibrating means, said cable-vibrating means including means for pressing against said cable with varying force to cause periodic movement of said cable and said grapple means; and control means to alternately connect said drive-shaft to said cable wind-up means and then to said cable-vibrating means when said cable has been drawn taut by said wind-up means.

10. The tree-shaking device of claim 9 wherein said cable-vibrating means comprises an eccentrically mounted, variable-stroke cable-engaging sheave means, and a rotatable shaft attached to said sheave means and mounted on said frame.

11. In combination with a vehicle having a power take-off, a device for providing vibratory motion to an object located at a fixed distance from the vehicle, comprising: a frame attachable to the vehicle; a drive shaft mounted on said frame; means for connecting said drive shaft with the power take-off of said vehicle; a drum shaft attached to said frame; a cable drum mounted on said drum shaft and a cable attached to said drum; grapple means attached to the end of said cable; brake means on said drum shaft; a first pulley on said drive shaft and a pulley on said drum shaft; a first belt means connecting said first pulley and said pulley on said drum shaft; a second shaft attached to said frame; a face-plate mounted on said second shaft, and a cable-engaging sheave having guide flanges and being eccentrically attached to said face-plate; said cable being adapted to pass partially around said cable-engaging sheave and between its guide flanges; a second pulley on said drive shaft and a pulley on said second shaft; a second belt means connecting said second pulley on said drive shaft and said pulley on said second shaft; and control means for alternatively and selectively transferring power from said drive-shaft to said cable drum-shaft and to said second shaft attached to said face-plate.

12. The device described in claim 11 wherein said control means comprises first and second control levers; a clutch means on said drive-shaft adapted to engage said first pulley to cause rotation thereof with said drive shaft to drive said drum-shaft; linkage means connecting said clutch means and said first control lever; and means connected to said second control lever to engage said second belt means to drive said second shaft.

13. A tree-shaking device adaptable for mounting on a vehicle having a power take-off, comprising: a frame attachable to the vehicle; a drive-shaft means mounted on said frame, having means to connect with the power take-off of said vehicle; a drum-shaft attached to said frame, having a cable-drum and a pulley mounted thereon, a cable being attached to said drum at one end and having a grapple means connected to its other end; brake means adapted to operate on said drum-shaft; means to guide said cable from said drum; a normally-slipping sheave and a fixed pulley on said drive-shaft; a first-belt means extending around said sheave and around said pulley on said drum-shaft; clutch means to engage said slipping-sheave with said drive-shaft to drive said drum-shaft; a first-control lever means to actuate said clutch means; a second-shaft attached to said frame and located between said cable-drum and said cable means and having a pulley fixed thereto, a faceplate mounted on said second-shaft, a cable-vibrating sheave having guide-flanges and being eccentrically attached to said face-plate, said cable being adapted to pass from said cable-drum and partially around said cable-vibrating sheave; a second normally-loose belt means extending around said fixed-pulley on said drive-shaft and around said pulley on said second-shaft; a second-control lever; and means associated with said second-control lever to apply pressure against and to increase tension of said second-belt means; whereby movement of the first-control lever transfers power to said drum-shaft to wind up the cable, thus making it taut after the grapple means has been attached to an object, and movement of the second-control lever increases tension in said second-belt means, causing rotation of said second shaft and inducing an oscillatory force on the taut cable as the cable-vibrating sheave alternately increases and decreases cable tension.

14. A tree-shaking device for use in combination with a vehicle having a power take-off, said device comprising: a frame, a drive-shaft mounted in said frame, having coupling means to connect said drive-shaft with said power take-off; a cable wind-up means mounted on said shaft; a cable attached to said wind-up means and having grapple means connected thereto; brake means to hold said cable wind-up means in a fixed position; cable-vibrating means comprising an eccentrically-mounted bearing member attached to a rotatable shaft mounted on said frame, said cable-vibrating means adapted to press directly against said cable with varying force to cause periodic movement of said cable and said grapple means; clutch means adapted to connect said driving means to rotate said cable wind-up means; a first lever means to actuate said clutch means; power transfer means located between said driving means and said cable-vibrating means; and a second-lever means adapted to act on said power transfer means to transfer power from said drive-shaft to actuate said cable-vibrating means.

15. A device for shaking trees and the like, to cause the removal of fruit therefrom, said device being attachable to a vehicle having a rotating power source and comprising in combination: a frame, a drive-shaft mounted on said frame having coupling means for connecting said drive shaft with said rotating power-source, a cable wind-up drum on said frame, a length of cable secured at one end to said cable wind-up drum and grapple means secured to the other end of the said cable, brake means on said wind-up drum, vibratory means adjacent said cable for periodically increasing and decreasing the tension thereof, and control means on said device for transferring power from said drive-shaft to either said cable wind-up drum or to said vibratory means, whereby said grapple means may be attached to a tree limb and said cable drawn taut by said wind-up drum, after which said vibratory means is applied to the cable, causing said grapple means to shake the tree.

16. In combination with a vehicle having a power take-off, a device for providing vibratory motion to an object located at a fixed distance from the vehicle, comprising: a frame attachable to the vehicle; a drive shaft mounted on said frame, including means for coupling with the power take-off of said vehicle; a drum shaft attached to said frame; a cable drum mounted on said drum shaft; a cable attached at one end to said drum; grapple means attached to the other end of said cable; brake means on said drum shaft; means connected to said frame for guiding said cable from said drum in any desired direction; a normally slipping sheave on said drive shaft; a first belt means extending around said sheave and around a fixed pulley on said drum shaft; clutch means for engaging said slipping sheave with said drive shaft to drive said drum shaft; a first control lever means connected to and adapted to actuate said clutch means; a second shaft attached to said frame; a face-plate mounted on said second shaft and located between said cable drum and said guide means; a cable-engaging sheave having guide flanges and eccentrically attached to said face-plate, said cable being adapted to pass partially around said cable-engaging sheave between its guide flanges; a second normally loose belt means extending around said drive shaft and around said second shaft; a second control lever; and means associated with said second control lever for applying pressure against said second belt means for increasing the tension thereof; whereby movement of said first control lever transfers power to said drum shaft to wind-up said cable, thus making it taut after said grapple means has been attached to an object, and movement of said second control lever increases tension in said second belt means to rotate said second shaft, causing an oscillating force on the taut cable which alternately increases and decreases the cable tension and causes vibration of the attached object.

References Cited in the file of this patent

UNITED STATES PATENTS

| | | |
|---|---|---|
| 309,575 | Sharpnack et al. | Dec. 23, 1884 |
| 2,336,684 | Hendrickson | Dec. 14, 1943 |
| 2,503,990 | Balsbaugh | Apr. 11, 1950 |
| 2,542,665 | Gustafson | Feb. 20, 1951 |
| 2,558,254 | Johnson | June 26, 1951 |
| 2,567,872 | Burke | Sept. 11, 1951 |
| 2,656,669 | Avansino | Oct. 27, 1953 |